UNITED STATES PATENT OFFICE.

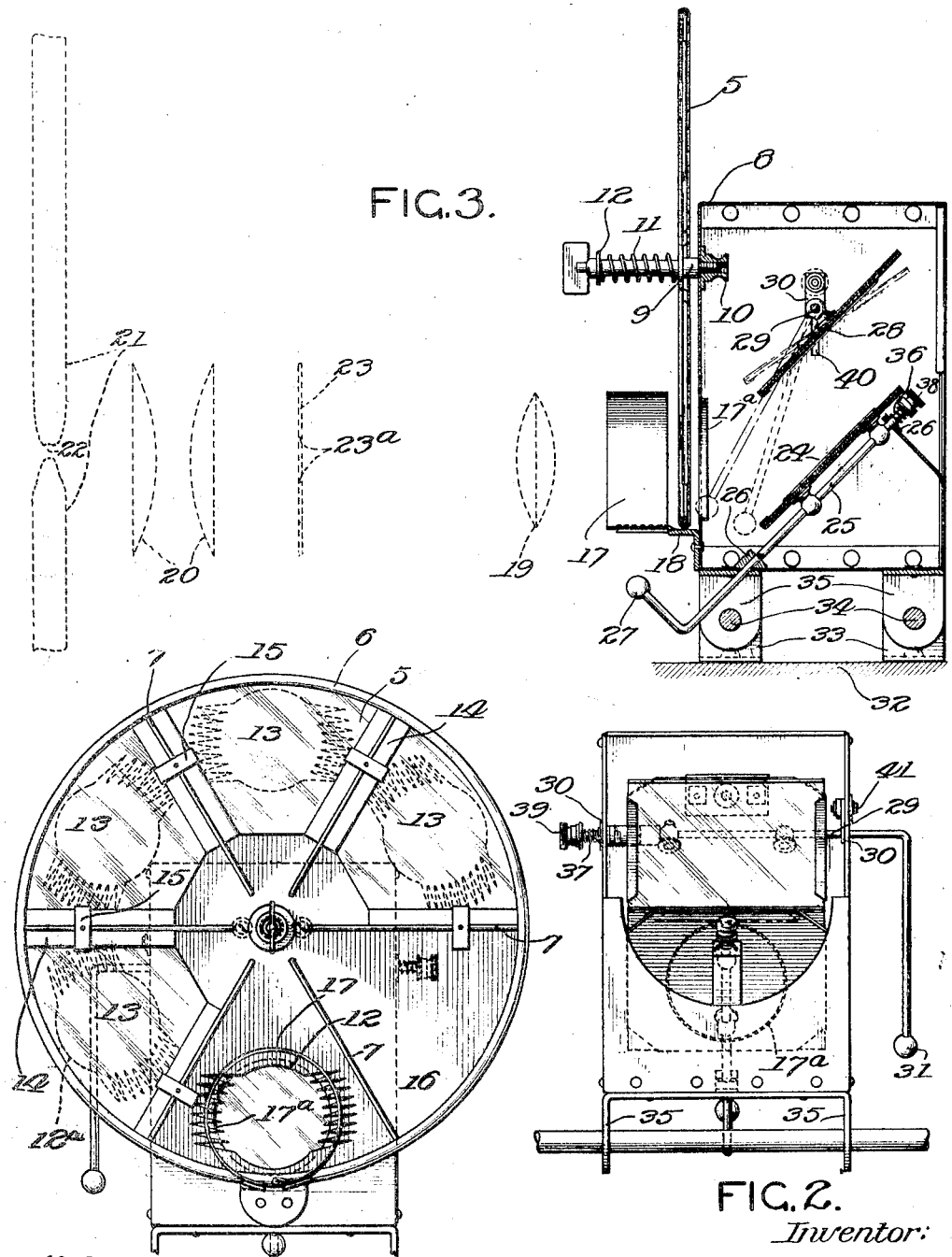

EMIL P. RAUSCHERT, OF LAKE MILLS, WISCONSIN.

SPOT-LIGHT ATTACHMENT FOR PROJECTION APPARATUS.

1,089,080. Specification of Letters Patent. Patented Mar. 3, 1914.

Application filed June 7, 1913. Serial No. 772,301.

*To all whom it may concern:*

Be it known that I, EMIL P. RAUSCHERT, a citizen of the United States, residing at Lake Mills, in the county of Jefferson and State of Wisconsin, have invented certain new and useful Improvements in Spot-Light Attachments for Projection Apparatus.

The apparatus heretofore used for producing a spot light has included a lamp, relatively large condensing lenses, and a large disk carrying colored transparent sheets to be interposed in the path of the beam of light. Such an apparatus is not only expensive, but is of such size that it cannot be placed in the operator's booth of the ordinary moving-picture theater.

The object of my invention is to provide a spot-light-producing apparatus that shall be of such size that it may be used in a small booth, and that shall be inexpensive. This object I attain by utilizing the lamp of the picture machine as the source of light, and by providing a set of adjustable mirrors arranged to be positioned in front of the lens tube of the picture machine. When colored lights are desired, a disk bearing colored transparent plates may be associated with the set of mirrors. Owing to the relatively small size of the beam of light at the point where it leaves the lens tube, said disk may be made of small diameter. Instead of varying the size of the spot of light by adjusting the position of the lamp, as in the large machines of the prior art, I utilize the slide carrier of the picture machine, placing in said carrier a slide having an aperture of the desired size.

I have illustrated one embodiment of my invention by the use of the accompanying drawings.

Figure 1 of the drawings is a rear elevation of the spot-light attachment. Fig. 2 is a front elevation of the same with the disk for producing the various colored lights omitted; and Fig. 3 is a vertical central section of the device showing how it is to be placed with relation to the projection apparatus, the essential elements of the projection apparatus being indicated in dotted lines.

The present embodiment of my invention comprises a rotary disk which is so placed in front of the projecting lenses of the projecting apparatus as to receive the light from the lenses near the periphery of the disk, so that, as the disk is rotated, the light will pass through openings in the disk near its periphery; and by having the respective openings covered with different colored transparent films the light which passes through the openings and films, and upon the distant object, will be colored in accordance with the particular film that may be used. One of the openings, however, contains no film and therefore transmits the normal light; and one portion of the disk is left without an opening so that the light may be by this portion entirely excluded. As the light passes through any one of the openings, it falls upon a mirror so placed as to reflect the light upward substantially vertically. The light then falls upon a second mirror so arranged as to reflect the light forwardly in substantially a horizontal direction. Means are provided for conveniently tilting either or both of the mirrors and thus varying the direction of the passage of the light within such limits as may be necessary. To facilitate the application of the device to the projection apparatus and its removal therefrom, the device is arranged on slides by means of which it is slid to the proper place adjacent the projecting lens, or it may be removed therefrom without delay.

In the particular embodiment of my invention which I have illustrated herein, I make use of a disk 5 composed of sheet metal, or other suitable material, stiffened by means of the encircling ring 6 and the spokes 7. The disk is rotatably supported on a frame-work or casing 8 by means of a pin 9 passing through the center of the disk and fixed at its inner end to the casing by means of a nut 10. The spring 11 encircles the pin, and is compressed between the disk 5 and the collar 12 on the outer end of the pin, and thus produces sufficient friction resisting the rotation of the disk to hold the disk in position after it has been suitably rotated. Near the periphery of the disk are a plurality of openings 12$^a$, and covering some of these openings are sheets or films 13 of variously colored transparent material. Any suitable material may be used for the purpose; I prefer the use of gelatin. These films are held in place by means of strips 14 of metal, or other suitable material, which are held in place, by means of spring clip 15, adjacent to the spokes 7, and which thus securely fasten in place the colored films of gelatin. One, or more, of the openings is left uncovered, and a portion 16 of the disk contains no aperture.

A cylinder 17 is attached to the lower portion of the casing by means of a lug 18 fixed to the casing immediately below the lower edge of the disk; and, registering with this cylinder, is an opening 17a in the casing 8. As the disk is rotated the openings therein pass between the cylinder 17 and the opening 17a in the casing, and register therewith; and the particular color of light which is projected upon the screen will depend upon the color of the film of gelatin covering the particular opening which is allowed to remain opposite the cylinder. The light which is to be projected is generated by passing a current of electricity through the carbons 21 so as to form an arc in the space 22, and the light passes in the usual manner through the condensing lenses 20 and the projecting lens 19, and thence through the cylinder 17 and the openings 12a and 17a. As the light passes through the opening 17a it falls upon the mirror 24, which is fixed to the rod 25. This rod is journaled in bearings 26 fixed to the casing 8, so that when the rod, by means of the handle 27, is rotated the mirror 24 will be inclined at any desired angle. The light striking on the mirror will be reflected upwardly and will strike upon the mirror 28 which is fixed to the rod 29. This rod 29 is journaled in bearings 30 in the casing of the device, and may be rotated by means of the handle 31.

The device is supported in any suitable manner. Herein I have shown it supported on the table 32 to which are attached lugs 33 which support rods 34 on which are slidably mounted the legs 35 of the device. By this means the device may be slid to its proper position in front of the projecting lens, or may be removed as desired.

In use a special plate, or slide, 23 is inserted in the ordinary slide carrier of the projecting apparatus. This plate 23 has an opening 23a therethrough which is concentric with the axis of the lens system, and the size of the opening determines the size of the spot-light projected upon the stage. By the use of plates having openings of various sizes, the size of the spot-light may be varied as desired without in any way disturbing the light or the lenses of the projecting apparatus.

When the operator of the picture machine desires to throw a beam of light upon a person on the stage or in the audience, he places a slide 23 in the slide carrier, and pushes the attachment along the rods 34 until the cylinder 17 registers with the projecting end of the projecting apparatus. The disk 8 is then rotated until the desired opening 12a registers with the cylinder 17. The beam of colored light, or, if desired, white light, passes through the opening 17a and falls upon the mirror 24, is reflected upwardly, falls upon the mirror 28 and is reflected forwardly. By means of the handle 27 the mirror 24 may be rotated around the axis of the rod 25 so as to throw the upwardly passing beam toward the right or the left of the operator, or of the stage. The mirror 28 may be rotated around the axis of the rod 29 so as to throw the light horizontally, or above or below the horizontal direction as much as may be desired. So that by means of these mirrors light may be directed to any point on the stage. If it is desired to shut off the light, the portion 16 of the disk is rotated into the pathway of the beam of light. In order that the best results may be obtained, it is desirable to have the mirrors ground smooth so that all irregular reflections will be avoided; and also to have the glass as thin as possible so as to substantially eliminate the effects of the secondary reflection from the surface of the glass. In order to avoid any movement of the mirrors after they have been properly positioned, springs 36 and 37 are provided. These springs are compressed between the respective bearings 26 and 30 and the adjusting nuts 38 and 39, so that in each case the friction caused thereby will prevent the inadvertent rotation of the mirrors.

A slot 40 is provided in the casing through which a screw 41 passes. The screw 41 holds in place the bearing 30 of the shaft 29, and by loosening this screw the bearing may be shifted upwardly or downwardly so as to incline to a limited extent the shaft 29.

Although I have described with some particularity various details of the apparatus which I have chosen to illustrate my invention, yet it is to be understood that modifications therein may be made by those skilled in the art without departing from the spirit of my invention as set forth in the following claims.

I claim as my invention:

1. A spot-light attachment for projection apparatus comprising a disk, said disk having a plurality of openings therethrough equidistant from the center of said disk; films covering some of said openings, said films being transparent to certain colors only; a casing rotatably supporting said disk, said casing having an opening therethrough which registers respectively with the openings through said disk as the disk rotates; an inclined mirror mounted in said casing adjacent the opening in said casing; a pivoted inclined mirror mounted in said casing; said casing having a second opening therethrough adjacent said second mirror; means for rotating said pivoted mirror; and means for movably supporting said casing.

2. A spot-light attachment for projection apparatus comprising a disk, said disk having a plurality of openings therethrough equidistant from the center of said disk; colored sheets covering some of said openings; a casing rotatably supporting said disk, said casing having an opening therethrough which registers respectively with the openings through said disk as the disk rotates; a pivoted inclined mirror mounted in said casing adjacent the opening in said casing; a second inclined mirror mounted in said casing; said casing having a second opening therethrough adjacent said second mirror; and means for rotating said pivoted mirror.

3. A spot-light attachment for projection apparatus comprising a disk, said disk having a plurality of openings therethrough equidistant from the center of said disk; means for rotatably supporting said disk; colored sheets covering some of said openings; a casing having an opening therethrough which registers respectively with the openings through said disk as the disk rotates; an inclined mirror mounted in said casing adjacent the opening in said casing; a pivoted inclined mirror mounted in said casing; said casing having a second opening therethrough adjacent said second mirror; and frictional means resisting rotation of said disk.

4. A spot-light attachment for projection apparatus comprising a disk, said disk having a plurality of openings therethrough equidistant from the center of said disk; transparent colored sheets covering some of said openings; a casing rotatably supporting said disk, said casing having an opening therethrough which registers respectively with the openings through said disk as the disk rotates; a pivoted inclined mirror mounted in said casing adjacent the opening in said casing; a second pivoted inclined mirror mounted in said casing, said casing having a second opening therethrough adjacent said second mirror; means for rotating each of said mirrors and adjustable frictional means resisting the rotation of said mirrors.

5. A spot-light attachment for projection apparatus comprising a disk, said disk having a plurality of openings therethrough; sheets covering some of said openings, said sheets being transparent to certain colors only; a casing upon which said disk is rotatably mounted, said casing having an opening therethrough which registers respectively with the openings through said disk as the disk rotates; a mirror mounted in said casing adjacent the opening in said casing; a second mirror mounted in said casing, said casing having a second opening therethrough adjacent said second mirror; means for rotating each of said mirrors; and a cylinder attached to said casing substantially concentric with the first mentioned opening through said casing.

6. A spot-light attachment for projecting apparatus comprising a member having an opening therethrough, a casing movably supporting said member, said casing having an opening therethrough adapted to register with the opening through said member, an inclined mirror mounted in said casing adjacent the opening in said casing, a pivoted mirror mounted in said casing, said casing having a second opening therethrough adjacent said second mirror, means for rotating said pivoted mirror, and means for movably supporting said casing.

7. A spot-light attachment for projecting apparatus comprising a member, said member having a plurality of openings therethrough, colored films covering said openings, a casing movably supporting said member, said casing having an opening therethrough adapted to register respectively with the openings through said member as the member is moved, an inclined mirror mounted in said casing adjacent to the opening of said casing, a pivoted mirror mounted in said casing, said casing having a second opening therethrough adjacent said second mirror, means for rotating said pivoted mirror, and means for movably supporting said casing.

8. The combination of a source of light, a system of lenses for refracting a beam of light from said source, means for varying the direction of said beam, and means whereby said varying means may be brought into coaction with said beam of light.

9. A spot-light attachment for projecting apparatus comprising a casing having a light-admitting opening, an inclined mirror mounted in said casing adjacent said opening, an adjustably mounted mirror in said casing arranged to reflect a beam of light received from the first mentioned mirror, said casing having an opening adjacent said second mirror for the exit of the light, means for adjusting said adjustable mirror, means for coloring the light, and means for movably supporting said casing.

In testimony whereof I affix my signature in presence of two witnesses.

EMIL P. RAUSCHERT.

Witnesses:
EARL C. CARLSON,
GEORGE L. CHINDAHL.

Copies of this patent may be obtained for five cents each, by addressing the "Commissioner of Patents, Washington, D. C."